(12) United States Patent
Watanabe et al.

(10) Patent No.: US 9,051,200 B2
(45) Date of Patent: *Jun. 9, 2015

(54) DISK ROLL AND BASE MATERIAL THEREOF

(75) Inventors: Kazuhisa Watanabe, Tokyo (JP);
Masaaki Nakayama, Tokyo (JP);
Osamu Horiuchi, Tokyo (JP)

(73) Assignee: NICHIAS CORPORATION, Tokyo (JP)

( * ) Notice: Subject to any disclaimer, the term of this patent is extended or adjusted under 35 U.S.C. 154(b) by 147 days.

This patent is subject to a terminal disclaimer.

(21) Appl. No.: 13/064,642

(22) Filed: Apr. 5, 2011

(65) Prior Publication Data

US 2012/0255327 A1    Oct. 11, 2012

(51) Int. Cl.
| | |
|---|---|
| *B25F 5/02* | (2006.01) |
| *C03B 17/06* | (2006.01) |
| *B65H 27/00* | (2006.01) |
| *C04B 33/32* | (2006.01) |
| *C04B 33/36* | (2006.01) |
| *C04B 35/636* | (2006.01) |

(52) U.S. Cl.
CPC .............. *C03B 17/061* (2013.01); *B65H 27/00* (2013.01); *C03B 17/068* (2013.01); *C04B 33/32* (2013.01); *C04B 33/36* (2013.01); *C04B 35/636* (2013.01); *C04B 2235/3427* (2013.01); *C04B 2235/5228* (2013.01); *C04B 2235/5264* (2013.01); *C04B 2235/6567* (2013.01); *C04B 2235/77* (2013.01); *C04B 2235/94* (2013.01); *C04B 2235/9607* (2013.01)

(58) Field of Classification Search
CPC .... C04B 30/02; C04B 20/0052; C04B 35/14; C04B 35/18; F16C 2019/36

USPC .............. 428/64.1, 66.4, 66.6, 137, 150, 848, 428/325, 218, 40, 332, 454; 74/424.85, 74/424.88; 501/307, 53, 36, 98.1, 95.2, 501/123, 134, 153; 425/70; 442/400; 65/33.7, 374.13, 90; 264/293, 319
See application file for complete search history.

(56) References Cited

U.S. PATENT DOCUMENTS

| | | | |
|---|---|---|---|
| 4,533,581 A | 8/1985 | Azaumi et al. | |
| 5,681,480 A * | 10/1997 | Langley et al. | ............... 210/727 |
| 6,896,646 B2 | 5/2005 | Kaiser et al. | .................... 492/40 |
| 7,284,328 B2 | 10/2007 | Kaiser | ........................ 29/895.21 |
| 7,507,194 B2 | 3/2009 | Neubauer et al. | ............... 492/40 |
| 7,781,043 B2 | 8/2010 | Nakayama et al. | |
| 7,842,632 B2 | 11/2010 | Neubauer et al. | ............ 501/95.1 |
| 8,827,883 B2 * | 9/2014 | Horiuchi et al. | ................ 492/40 |

(Continued)

FOREIGN PATENT DOCUMENTS

| | | |
|---|---|---|
| JP | 2004-299980 | 10/2004 |
| JP | 2007-197264 | 8/2007 |

(Continued)

OTHER PUBLICATIONS

Machine translation JP 2007-197264 (Aug. 2007) Nichias.*

*Primary Examiner* — Kevin Bernatz
(74) *Attorney, Agent, or Firm* — Steptoe & Johnson LLP

(57) ABSTRACT

A disk roll base material includes 20 to 38 wt % of alumina silicate wool that include 40 to 60 wt % of alumina and 40 to 60 wt % of silica, and have a content of shots having a dimension of 45 μm or more of 5 wt % or less, 10 to 30 wt % of kibushi clay, 2 to 20 wt % of bentonite, and 20 to 40 wt % of mica.

15 Claims, 1 Drawing Sheet

(56) References Cited

U.S. PATENT DOCUMENTS

| | | |
|---|---|---|
| 2004/0220032 A1 | 11/2004 | Nakayama et al. ............ 492/40 |
| 2007/0131372 A1* | 6/2007 | Plouff et al. .................. 162/158 |
| 2008/0081179 A1* | 4/2008 | Li et al. ......................... 428/332 |
| 2008/0093778 A1* | 4/2008 | Johnson et al. ............... 442/400 |
| 2008/0120995 A1* | 5/2008 | Neubauer et al. ............. 65/33.7 |
| 2009/0149310 A1* | 6/2009 | Neubauer et al. ........... 501/95.2 |
| 2009/0272151 A1* | 11/2009 | Lacasse et al. ............. 65/374.13 |
| 2010/0064729 A1* | 3/2010 | Nakayama et al. ........... 428/218 |
| 2010/0113238 A1* | 5/2010 | Horiuchi et al. ................ 492/40 |
| 2010/0272647 A1 | 10/2010 | Aparicio et al. ............... 424/9.2 |
| 2011/0023547 A1 | 2/2011 | Neubauer et al. ................ 65/90 |
| 2011/0168344 A1* | 7/2011 | Klein et al. ................ 162/164.6 |
| 2011/0287916 A1 | 11/2011 | Watanabe et al. |
| 2014/0291892 A1* | 10/2014 | Horiuchi et al. .............. 264/299 |

FOREIGN PATENT DOCUMENTS

| JP | 2007-269604 | 10/2007 |
|---|---|---|
| JP | 2009-132619 | 6/2009 |
| JP | 2010-510956 | 4/2010 |
| JP | 2010-111541 | 5/2010 |
| JP | 2011-241920 | 12/2011 |
| JP | 4920118 | 4/2012 |

\* cited by examiner

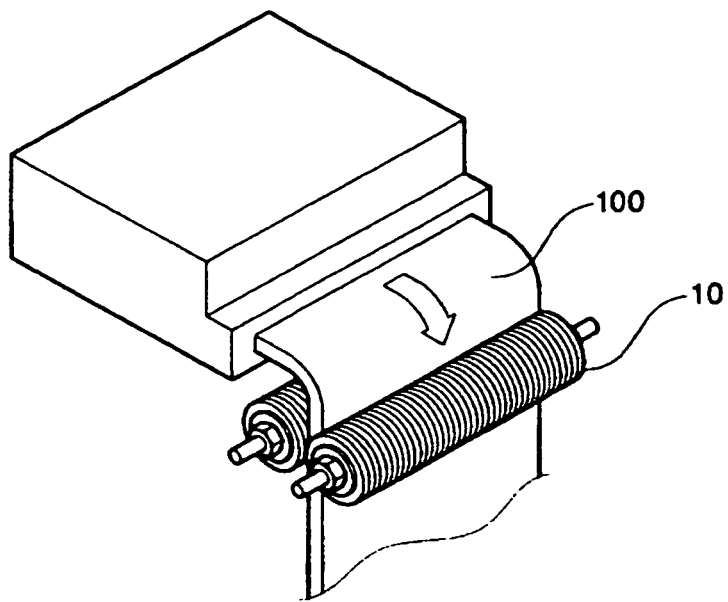

DISK ROLL AND BASE MATERIAL THEREOF

TECHNICAL FIELD

The invention relates to a disk roll and a disk roll base material thereof that may suitably be used to produce sheet glass.

BACKGROUND

Sheet glass is normally produced by continuously supplying molten glass to an apparatus, and downdrawing the molten glass from the apparatus in the shape of a strip to allow the molten glass to cool and solidify. Disk rolls, which function as a pair of tensile rolls, are used to hold and downdraw the molten glass.

A plurality of ring-shaped disk materials cut from a millboard (sheet-shaped product or base material) are normally attached (fitted) to a shaft (rotary axis) to obtain a roll-shaped stack. The roll-shaped stack is pressed and secured from both ends via a flange. The outer circumferential surface of the disk materials serves as a molten glass transfer surface.

The disk roll that transfers strip-shaped molten glass is required to exhibit heat resistance, flexibility, and hardness, and not to damage the surface of glass. For example, a disk roll that contains heat-resistant inorganic wool, mica, and clay has been known (see JP-T-2010-510956, JP-A-2009-132619, and JP-A-2004-299980).

A disk roll is normally produced by a suction-dehydration molding method or a papermaking method using an aqueous slurry depending on the drainage. The papermaking method can produce a large sheet with good efficiency, but requires high drainage.

SUMMARY OF THE INVENTION

However, inorganic wool containing 70 wt % or more of heat-resistant alumina (raw material) are expensive. Moreover, efficient production of a disk roll requires use of a papermaking method, and also requires a reduction in drainage time when draining water from an aqueous slurry.

An object of the invention is to provide a disk roll and a disk roll base material that can be efficiently produced without using expensive wool.

The invention provides the following disk roll base material and the like.

1. A disk roll base material including:
  about 20 to about 38 wt % of alumina silicate wool that include about 40 to about 60 wt % of alumina and about 40 to about 60 wt % of silica, and have a content of shots having a size of about 45 μm or more of about 5 wt % or less,
  about 10 to about 30 wt % of kibushi clay,
  about 2 to about 20 wt % of bentonite, and
  about 20 to about 40 wt % of mica.
2. The disk roll base material according to 1, further including pulp and starch.
3. A method of producing a disk roll base material including:
  removing shots from crude wool that include about 40 to about 60 wt % of alumina and about 40 to about 60 wt % of silica to obtain alumina silicate wool having a content of shots having a size of about 45 μm or more of about 5 wt % or less,
  mixing water, the alumina silicate wool, kibushi clay, bentonite, and mica to obtain an aqueous slurry,
  pouring the aqueous slurry into a mold, and
  draining water from the aqueous slurry to obtain a sheet.
4. A disk roll including the disk roll base material according to 1 or 2.
5. A method of producing glass including transferring molten glass using the disk roll according to 4 and cooling the molten glass.

The invention can provides a disk roll and a disk roll base material that can be efficiently produced without using expensive wool.

BRIEF DESCRIPTION OF THE DRAWINGS

FIG. 1 is a view illustrating an example of a method of producing glass using disk rolls.

DETAILED DESCRIPTION OF THE PREFERRED EMBODIMENTS

A disk roll base material according to the invention includes ceramic wool (alumina silicate wool), kibushi clay, bentonite, and mica.

The content of the ceramic wool in the base material is 20 to 38 wt %, preferably 25 to 38 wt %, and more preferably 25 to 35 wt %. If the content of the ceramic wool is less than 20 wt %, the heat resistance of the base material may deteriorate. If the content of the ceramic wool exceeds 38 wt %, the wear resistance of the base material may deteriorate due to an increase in void volume.

The ceramic wool include 40 to 60 wt %, preferably 45 to 55 wt % of alumina. The ceramic wool also include 40 to 60 wt %, preferably 45 to 55 wt % of silica. One kind or mixtures of two or more kinds of wool may be used.

The ceramic wool normally have an average fiber diameter of about 2 to about 5 μm.

The ceramic wool used as a raw material normally include shots. The shot content may be reduced by a dry or wet method.

The ceramic wool have a low content of shots having a size of 45 μm or more of 5 wt % or less, preferably 2 wt % or less. A disk roll produced using wool having a high shot content may damage the surface of glass. The size of shots is normally about 45 to about 5000 μm.

The base material includes 10 to 30 wt %, preferably 15 to 25 wt % of kibushi clay. If the base material includes kibushi clay within the above range, good surface lubricity (smoothness) is obtained.

The base material includes 2 to 20 wt %, preferably 2 to 15 wt %, more preferably 3 to 15 wt %, still more preferably 5 to 15 wt % of bentonite. If the base material does not include bentonite, drainage is insufficient due to insufficient fixation and coagulation. If the bentonite content is too high, drainage may deteriorate.

Mica is added so that the disk material easily follows thermal expansion of the shaft. The disk materials are attached (fitted) to a shaft made of a metal. When the disk materials and shaft are subjected to a high temperature, the shaft expands due to heat along the axial direction. Since the disk materials have a low coefficient of thermal expansion as compared with the metal, the disk materials cannot follow expansion of the shaft, so that the disk materials are separated from each other. Mica undergoes crystal transformation upon heating due to a very thin layered stack structure. However, since mica tends to expands in the layered stack direction, the disk materials easily follow expansion of the shaft due to expansion in the layered stack direction.

White mica (muscovite; $K_2AL_4(Si_3Al)_2O_{20}(OH)_4$), black mica, gold mica (phlogopite: $K_2Mg_6(SiAl)_2O_{20}(OH)_4$), palagonite, lepidolite and synthetic fluorine mica or the like may be used as mica. Among these, white mica is preferable from the viewpoint of followability.

The base material includes 20 to 40 wt %, preferably 25 to 35 wt % of mica. If the mica content is less than 20 wt %, the disk material may not sufficiently follow thermal expansion of the shaft. If the mica content exceeds 40 wt %, it may be difficult to prepare a slurry in which the mica is uniformly dispersed, so that the properties of the resulting disk base material may vary to a large extent.

The base material according to the invention may further include a coagulant aid and an organic binder insofar as the advantages of the invention are not impaired.

Organic wool (pulp) and starch are preferable as the organic binder. The organic wool (pulp) provide the base material with compressibility. The content of the organic wool (pulp) in the base material may be 2 to 10 wt % or 6 to 10 wt %. Starch provides the base material with strength. The content of starch in the base material may be 1 to 10 wt % or 1 to 4 wt %.

The base material according to the invention may include ceramic wool, kibushi clay, bentonite, and mica as inorganic components in an amount of 90 wt % or more, 95 wt % or more, 98 wt % or more, or 100 wt %.

If the base material according to the invention includes the above components within the above range, a disk roll that exhibits heat resistance and strength in a well-balanced manner with a small amount of inorganic wool can be obtained.

The base material may be produced by forming an aqueous slurry including the inorganic wool, kaolinite, and mica into a sheet, and drying the resulting sheet. It is preferable to use a papermaking method in order to efficiently produce the base material. Specifically, the base material may be produced by mixing given amounts of inorganic wool, kaolinite, and mica, optionally together with a coagulant aid, organic wool, an organic binder, and the like to prepare an aqueous slurry, forming the aqueous slurry into a sheet using a papermaking apparatus, and drying the resulting sheet. The thickness of the base material may be appropriately selected (normally 2 to 10 mm).

A method of producing a disk roll is described below. Normally, a plurality of ring-shaped disk materials cut from the base material are attached to a shaft made of a metal (e.g., iron) to obtain a roll-shaped stack. The roll-shaped stack is pressed from both ends via a flange thereon, and secured (fastened) using nuts or the like in a slightly compressed state. The resulting product is optionally fired. The outer circumferential surface of the disk materials are ground to have a given roll diameter to obtain a disk roll.

The disk roll may have a configuration in which the shaft is completely covered with the disk materials, a configuration in which only the parts of the shaft that come in contact with glass are covered with the disk materials, a single-axis configuration, or the like.

As shown in FIG. 1, molten glass 100 is transferred and cooled (solidified) between disk rolls 10 according to the invention to produce a glass sheet, for example.

EXAMPLES

Example 1

Removal of Shots from Crude Ceramic Wool

Shots were removed from crude ceramic wool including 40 to 60 wt % of alumina and 40 to 60 wt % of silica ("FINE FLEX™" manufactured by Nichias Corporation) to obtain ceramic wool having a content of shots having a size of 45 μm or more of 2 wt % or less.

The shot content was measured as described below.
(i) A specimen (100 g or more) was cut from arbitrary areas of the wool such that shots were not removed from the specimen.
(ii) The specimen was dried at 105 to 110° C. for 1 hour, and weighed ($W_0$).
(iii) The specimen was put in a cylinder, and ground at 21 MPa. After disentangling the specimen using a spatula, the specimen was ground under pressure again.
(iv) The ground specimen was placed on a JIS Z 8801 sieve (45 μm), and the wool and small shots were removed with running water.
(v) Shots that remained on the sieve were dried with the sieve for 1 hour using a dryer.
(vi) The sieve was removed from the dryer, and cooled to room temperature. Small particles adhering to the back surface of the sieve were removed by tapping the side surface of the sieve about 10 seconds.
(vii) Shots that remained on the sieve were transferred to a container. Shots were sufficiently removed from the sieve using a brush, and weighed ($W_1$).
(viii) The shot content was calculated by the following expression (the resulting value was rounded off to the nearest whole number).

$$\text{Shot content (\%)}=W_1/W_0\times100$$

Production of Disk Roll Base Material

An aqueous slurry containing 30 wt % of the above ceramic wool, 32 wt % of white mica, 20 wt % of kibushi clay, 10 wt % of bentonite, 6 wt % of pulp, and 2 wt % of starch was prepared. A disk roll base material (millboard) was produced by a papermaking method such that the dimensions after drying were 200 mm×200 mm×6 mm.

The density of the base material thus obtained was measured, and the following properties (1) to (7) were evaluated. The results are shown in Table 1.
(1) Bending test of raw board (flexural strength and flexural modulus)

The disk roll base material was held in a heating furnace at 900° C. for 3 hours, and allowed to cool to room temperature. A specimen (width: 30 mm, length: 150 mm, thickness: 6 mm) was cut from the cooled base material, and the flexural strength and the flexural modulus of the specimen were evaluated using a tester "Autograph AG-100kND" (manufactured by Shimadzu Corporation) in accordance with JIS K 7171.
(2) Bending test of mounted disk material (flexural strength and flexural modulus)

A disk material (width: 30 mm, length: 150 mm) was cut from the disk roll base material, and compressed between stainless steel sheets such that the thickness was 10 mm and the density was 1.25 g/cm³. The compressed disk material was held in a heating furnace at 900° C. for 10 hours, and allowed to cool to room temperature. The compressive force was then released to obtain a measurement sample. The flexural strength and the flexural modulus of the measurement sample were evaluated using a tester "Autograph AG-100kND" (manufactured by Shimadzu Corporation) in accordance with JIS K 7171.
(3) Thermal conductivity A disk material (width: 50 mm, length: 100 mm) was cut from the disk roll base material, and compressed between stainless steel sheets such that the thickness was 10 mm and the density was 1.25 g/cm³. The compressed disk material was held in a heating furnace at 900° C. for 10 hours, and allowed to cool to room temperature. The compressive force was then released to obtain a measurement sample. The thermal conductivity of the surface of the sample was measured at room temperature using a thermal conductivity meter "QTM-500" (manufactured by Kyoto Electronics Manufacturing Co., Ltd.) in accordance with JIS R 2618 (unsteady-state hot wire method).

(4) Coefficient of thermal expansion

Disk materials (outer diameter: 60 mm, inner diameter: 20 mm) were cut from the disk roll base material, and roll-built around a stainless steel shaft such that the length was 100 mm and the density was 1.25 g/cm$^3$, held in a heating furnace at 900° C. for 10 hours, and allowed to cool to room temperature. A measurement sample with dimensions of 5×5×20 mm was cut from the cooled sample. The measurement sample was heated from room temperature to 900° C. at 5° C./min in air using a thermomechanical analyzer "TMA8310" (manufactured by Rigaku Corporation) to measure the coefficient of thermal expansion.

(5) Restoration rate after compression and heating

A disk material (width: 30 mm, length: 50 mm) was cut from the disk roll base material, and compressed between stainless steel sheets such that the thickness was 20 mm and the density was 1.35 g/cm$^3$ to obtain a sample.

The sample was heated at 600° C. for 5 hours, and cooled to room temperature (25° C.). The length of the disk material measured after releasing the compressive force was divided by the original length to obtain the restoration rate. The disk roll obtained was heated at 900° C. for 10 hours, and the restoration rate was calculated as described above.

(6) Wear test

Disk materials (outer diameter: 80 mm, inner diameter: 30 mm) were cut from the disk roll base material, and roll-built around a stainless steel shaft (diameter: 30 mm) such that the length was 100 mm and the density was 1.25 g/cm$^3$ to obtain a disk roll.

The disk roll was rotated at 900° C. for 5 hours in a state in which the surface of the disk roll is in contact with a stainless steel shaft (diameter: 30 mm, five grooves having a width of 2 mm were formed at intervals of 2 mm thereon), and cooled to room temperature (25° C.). The depth of grooves formed in the surface of the disk roll was then measured.

(7) Amount of deformation under load

Disk materials (outer diameter: 60 mm, inner diameter: 20 mm) were cut from the disk roll base material, and roll-built around a stainless steel shaft (diameter: 20 mm) such that the length was 100 mm and the density was 1.25 g/cm$^3$ to obtain a disk roll.

Each end of the shaft was supported using a mount, and the amount of deformation (at room temperature) when a compressing element applies a load of 10 kgf/cm to the roll surface formed of the disk materials at 1 mm/min was measured.

Further, the disk roll was held in a heating furnace at 900° C. for 10 hours, removed from the heating furnace, and cooled to room temperature, and the amount of deformation under load (at 900° C. for 10 hours) of the roll was measured in the same manner as described above.

TABLE 1

| | | | Example 1 |
|---|---|---|---|
| Composition (wt %) | Ceramic wool | | 30 |
| | Mullite wool | | |
| | White mica | | 32 |
| | Kibushi clay | | 20 |
| | Bentonite | | 10 |

TABLE 1-continued

| | | | Example 1 |
|---|---|---|---|
| | Pulp | | 6 |
| | Starch | | 2 |
| Properties of raw board | Density (g/cm$^3$) | | 0.68 |
| | Bending test | Flexural strength (Mpa) | 2.79 |
| | | Flexural modulus (Mpa) | 1472 |
| Properties of mounted disk material | Density (g/cm$^3$) | | 1.25 |
| | Bending test | Flexural strength (Mpa) | 3.51 |
| | | Flexural modulus (Mpa) | 816 |
| | Thermal conductivity (W/mK) | | 0.19 |
| | Coefficient of thermal expansion | Longitudinal direction ($10^{-6}$ K) | 4.71 |
| | | Diametrical direction ($10^{-6}$ K) | 3.79 |
| Restoration | Density (g/cm$^3$) | | 1.35 |
| | Restoration rate after compression and heating | 600° C. × 5 hr [%] | 1.1 |
| | | 900° C. × 10 hr [%] | 1.3 |
| Properties of roll | Density (g/cm$^3$) | | 1.25 |
| | Wear rate (mm) | | 0.2 |
| | Amount of deformation under load | Room temperature (mm) | 0.15 |
| | | 900° C. × 10 hr [mm] | 0.11 |

As shown in Table 1, the disk rolls obtained in the example exhibited heat resistance, strength, wear resistance, and flexibility without using expensive wool. Moreover, since the shot content was low, the damage of glass surface was suppressed.

Examples 2 to 4 and Comparative Examples 1 and 2

Disk roll base materials and disk rolls were produced in the same manner as in Example 1, except for using the composition as shown in Table 2 to examine the effects of bentonite. The results are shown in Table 2. When the bentonite content was 30%, a base material could not be produced. Therefore, the properties of the roll were not measured.

(1) Drainage

The drainage was evaluated by the drainage time using a TAPPI hand-made papermaking apparatus.

◯: less than 100 seconds, Δ: 100 to 200 seconds, X: 200 seconds or more (2) Appearance of sheet ◯: excellent, Δ: non-uniform, X: cracks occurred (3) Thermal shrinkage rate A sample with a width of 30 mm and a length of 150 mm was cut from the disk roll base material, and heated at 900° C. for 3 hours. The dimensions in the longitudinal direction and the thickness direction were measured, and the thermal shrinkage rate was evaluated according to the following expression.

[(Value measured before heating−value measured after heating)/value measured before heating]× 100

TABLE 2

|  |  |  | Com. Ex. 1 | Ex. 2 | Ex. 3 | Ex. 4 | Com. Ex. 2 |
|---|---|---|---|---|---|---|---|
| Composition | | Bentonite | 0 | 5 | 10 | 20 | 30 |
| | | Kibushi clay | 22 | 21 | 20 | 18 | 15 |
| | | Treated wool | 34 | 32 | 30 | 26 | 23 |
| | | White mica | 36 | 34 | 32 | 28 | 24 |
| | | Pulp | 6 | 6 | 6 | 6 | 6 |
| | | Starch | 2 | 2 | 2 | 2 | 2 |
| Board formability | Drainage | Drainage time | 140 | 25 | 30 | 70 | 250 |
| | | Evaluation | Δ | ○ | ○ | ○ | X |
| | Appearance of sheet | Evaluation | Δ | ○ | ○ | ○ | X |
| Properties of sheet | Bulk density of raw board | g/cm$^3$ | 0.60 | 0.63 | 0.68 | 0.73 | 0.76 |
| | Thermal shrinkage rate (%) 900° C. × 3 hr | Longitudinal direction | 0.0 | 0.0 | 0.2 | 0.1 | 0.2 |
| | | Thickness direction | 3.1 | 1.5 | 1.6 | 1.8 | 2.5 |
| | Flexural strength (MPa) | Before heating | 3.43 | 3.90 | 4.72 | 6.10 | 7.45 |
| | | 900° C. | 1.56 | 2.18 | 2.79 | 4.44 | 4.37 |
| | Flexural modulus (MPa) | Before heating | 1087 | 1180 | 1377 | 1866 | 2291 |
| | | 900° C. | 670 | 1006 | 1472 | 2327 | 3473 |
| Properties of roll | Hardness (ShoreD) | Before heating | 49 | 51 | 50 | 53 | — |
| | | 900° C. | 52 | 52 | 52 | 57 | — |
| | Amount of deformation under load (mm) | Before heating | 0.15 | 0.12 | 0.15 | 0.13 | — |
| | | 900° C. | 0.12 | 0.13 | 0.11 | 0.11 | — |

The disk roll according to the invention can be used to produce sheet glass (particularly glass for liquid crystal displays and plasma displays).

Although only some exemplary embodiments and/or examples of this invention have been described in detail above, those skilled in the art will readily appreciate that many modifications are possible in the exemplary embodiments and/or examples without materially departing from the novel teachings and advantages of this invention. Accordingly, all such modifications are intended to be included within the scope of this invention.

The documents described in the specification are incorporated herein by reference in their entirety.

What is claimed is:

1. A composition for disk roll base material, comprising:
   20 to 38 wt % of alumina silicate wool that comprises 40 to 60 wt % alumina and 40 to 60 wt % silica, and not more than 5 wt % shots having a size of 45 μm or more,
   10 to 30 wt % kibushi clay,
   only 5 to 15 wt % bentonite, and
   20 to 40 wt % mica.

2. The composition according to claim 1, wherein the total amount of said alumina silicate wool, kibushi clay, bentonite, and mica comprises at least 90 wt % of said composition.

3. A method of producing a disk roll comprising:
   providing a plurality of ring-shaped disks which comprise a disk roll base material composition according to claim 1;
   mounting a plurality of the ring-shaped disks on a shaft to obtain a roll-shaped stack; and
   securing the roll-shaped stack of disks to the shaft.

4. A dried sheet of the composition for disk roll base material according to claim 1, wherein the thermal shrinkage characteristic of said dried sheet is less than 1.8% of the sheet thickness after heating at 900° C. for 3 hours.

5. A method of producing a disk roll base material, said method comprising:
   providing a composition according to claim 1;
   mixing water with said composition to obtain an aqueous slurry;
   forming the aqueous slurry into a sheet;
   and draining water from the formed aqueous slurry to obtain a de-watered sheet of disk roll base material.

6. The method of claim 5, wherein said composition additionally comprises pulp and starch.

7. The method of claim 5, wherein at least 90 wt % of said de-watered sheet comprises a composition comprising:
   20 to 38 wt % of alumina silicate wool that comprises 40 to 60 wt % alumina and 40 to 60 wt % silica, and not more than 5 wt % shots having a size of 45 μm or more,
   10 to 30 wt % kibushi clay,
   only 5 to 15 wt % bentonite, and
   20 to 40 wt % mica.

8. The method of claim 5 wherein the water is drained from the formed aqueous slurry sheet in less than 70 seconds.

9. The method of claim 5 wherein the de-watered sheet is further dried.

10. A composition for disk roll base material consisting essentially of:
    20 to 38 wt % of alumina silicate wool that comprises 40 to 60 wt % alumina and 40 to 60 wt % silica, and not more than 5 wt % shots having a size of 45 μm or more,
    10 to 30 wt % kibushi clay,
    only 5 to 15 wt % bentonite,
    20 to 40 wt % mica,
    pulp,
    and starch.

11. A method of producing a disk roll base material comprising:
    removing shots from crude wool, that comprises 40 to 60 wt % of alumina and 40 to 60 wt % of silica, to obtain alumina silicate wool having 5 wt % or less content of shots having a size of about 45 μm or more,
    mixing water, with a composition comprising: 20 to 38 wt % of the alumina silicate wool, 10 to 30 wt % kibushi clay, only 5 to 15 wt % bentonite, and 20 to 40 wt % mica, to obtain an aqueous slurry,
    pouring the aqueous slurry into a mold, and
    draining water from the aqueous slurry to obtain a de-watered sheet.

12. A method of producing ring-shaped disks comprising:
    removing shots from crude wool which comprises 40 to 60 wt % of alumina and 40 to 60 wt % of silica, to obtain alumina silicate wool having a shot content of 5 wt % or less, of shots of a size of about 45 μm or more,
    mixing water, with a composition comprising: 20 to 38 wt % of the alumina silicate wool, 10 to 30 wt % kibushi clay, only 5 to 15 wt % bentonite, and 20 to 40 wt % mica, to obtain an aqueous slurry,
    pouring the aqueous slurry into a mold, draining water from the aqueous slurry to obtain a sheet, and cutting ring-shaped disks from the sheet.

13. A ring-shaped disk comprising:

20 to 38 wt % of alumina silicate wool that comprises 40 to 60 wt % alumina and 40 to 60 wt % silica, and not more than 5 wt % shots having a size of 45 μm or more, 10 to 30 wt % kibushi clay, only 5 to 15 wt % bentonite, and 20 to 40 wt % mica.

14. A disk roll comprising a plurality of ring-shaped disks according to claim 13.

15. A method of producing glass comprising transferring molten glass using the disk roll according to claim 14 and cooling the molten glass.

\* \* \* \* \*